United States Patent [19]
Johnson

[11] 3,864,037
[45] Feb. 4, 1975

[54] IMAGING SPECTROSCOPIC METHOD AND APPARATUS

[76] Inventor: Quentin S. Johnson, P.O. Drawer 1334, Leesburg, Va. 22075

[22] Filed: Jan. 3, 1973

[21] Appl. No.: 320,734

[52] U.S. Cl. .............................. 356/74, 250/213 VT
[51] Int. Cl. ......................... G01j 3/00, H01j 31/50
[58] Field of Search ................... 250/333, 213 VT; 356/74–101, 51; 350/166, 315, 318

[56] References Cited
UNITED STATES PATENTS

| | | | |
|---|---|---|---|
| 2,437,418 | 3/1948 | Cawein | 250/333 |
| 2,522,493 | 9/1950 | Bailly | 250/333 |
| 2,708,389 | 5/1955 | Kavanagh | 356/96 X |
| 2,834,246 | 5/1958 | Foskett et al. | 356/51 X |
| 3,416,864 | 12/1968 | Keahl et al. | 356/100 |
| 3,457,002 | 7/1969 | Magrath | 356/100 X |
| 3,812,526 | 5/1974 | Tan | 250/213 VT X |

OTHER PUBLICATIONS

Fisher, "Obtaining Color Pictures with an Image Intensifier Tube," R.C.A. Technical Note No. 556, March 1964, 2 pages.

Bradley: British Journal of Applied Physics, Vol. 13, No. 2, February 1962, pages 83 and 84.

Ness et al., Analytical Chemistry, Vol. 41, No. 11, September 1969, pages 1467–1470.

Savage et al., Applied Optics, Vol. 10, No. 4, April 1971, pages 965–968.

*Primary Examiner*—Ronald L. Wibert
*Assistant Examiner*—F. L. Evans
*Attorney, Agent, or Firm*—Lane, Aitken, Dunner & Ziems

[57] ABSTRACT

A spectroscopic method and apparatus by which light energy emanating from an object or scene under observation is transmitted through a narrow band pass filter to produce an attenuated image of only those wavelengths of light energy passing the filter. The image is then intensified to a value adequate for direct and spontaneous viewing. Alternative embodiments are included, each having a capability for viewing the image in one of many narrow bands falling within a range including ultraviolet, visible and near infrared wavelengths.

26 Claims, 11 Drawing Figures

$$\lambda_\phi = \lambda_c \left(1 - \frac{\sin^2 \phi}{n^2}\right)^{\frac{1}{2}}$$

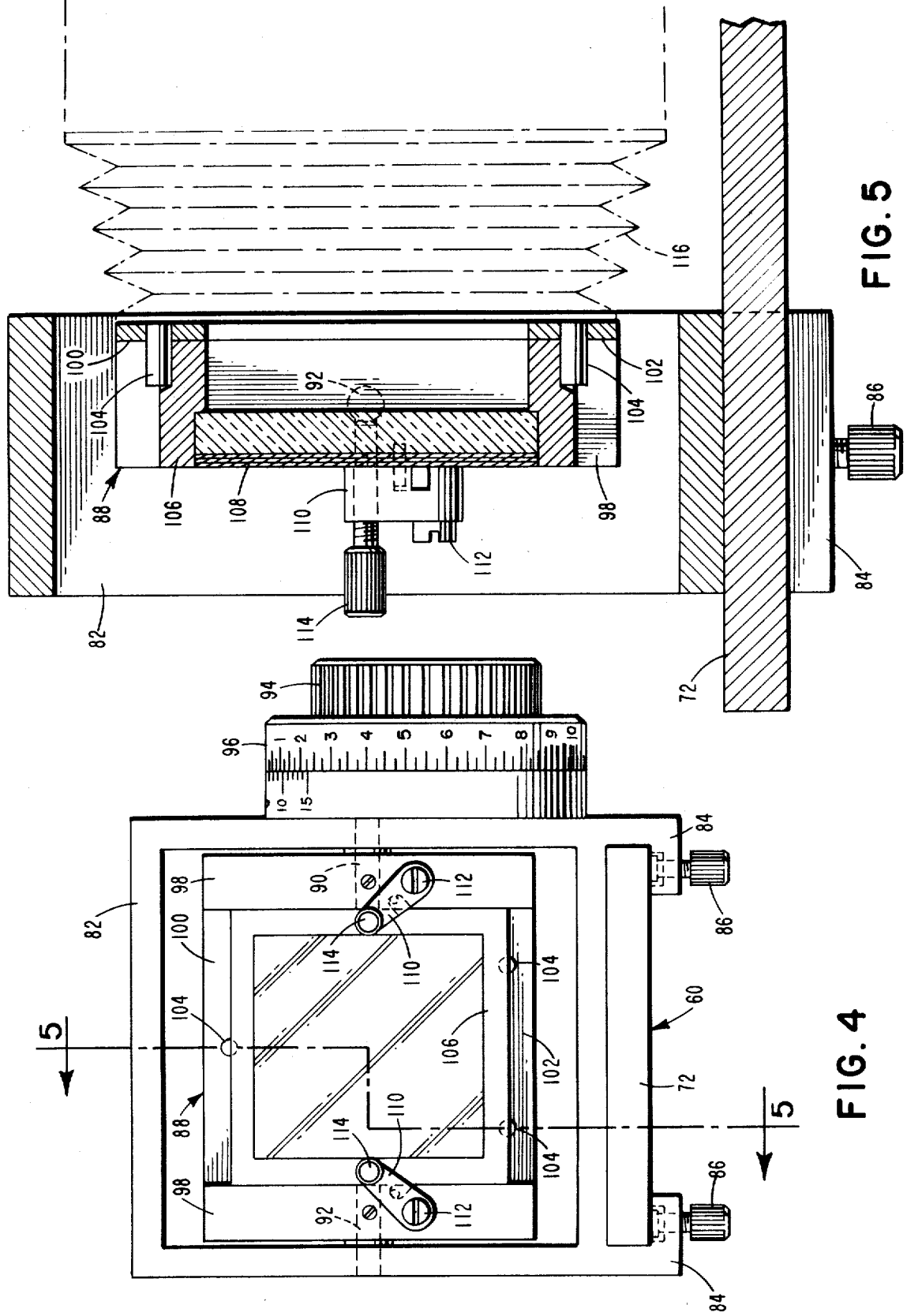

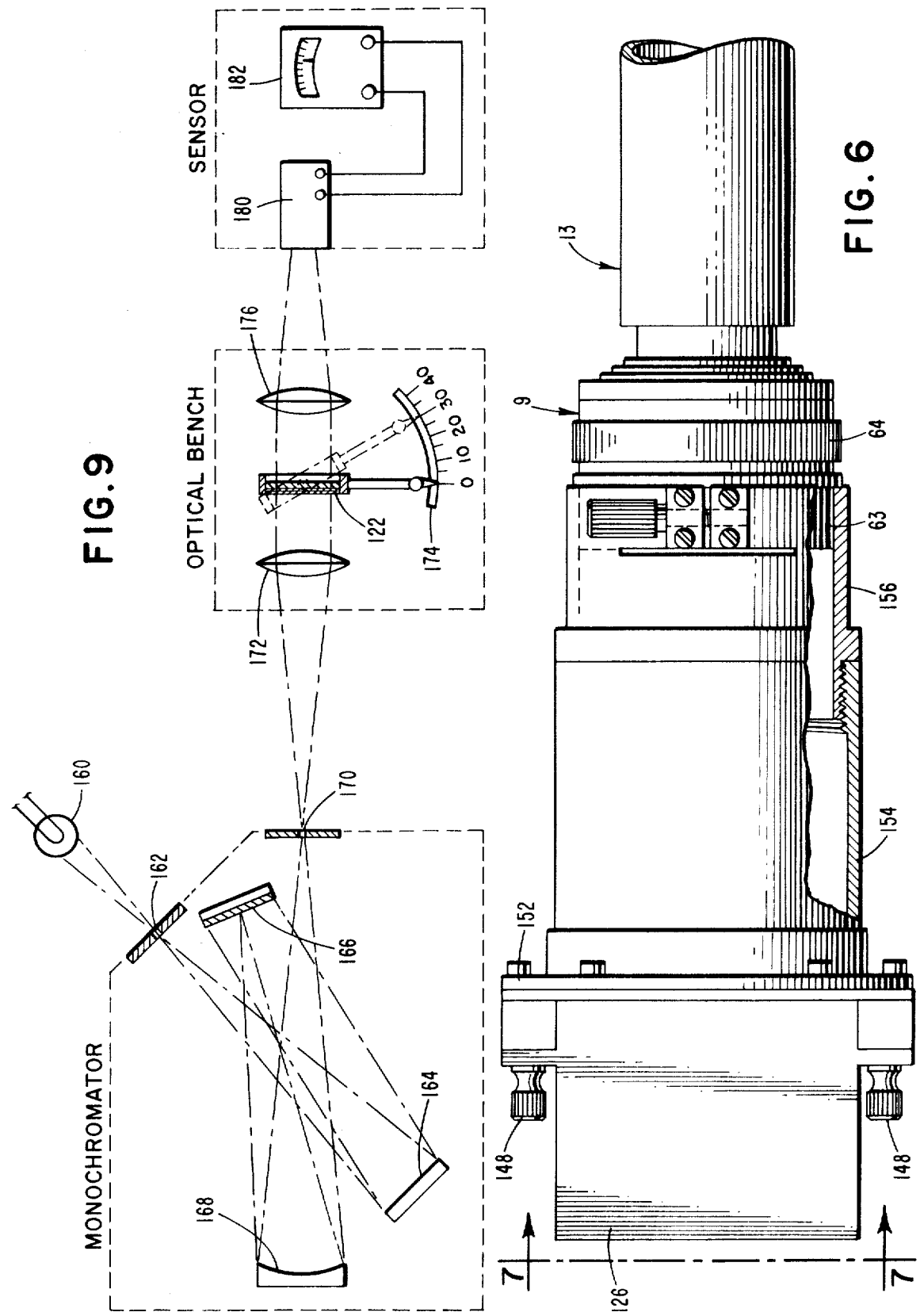

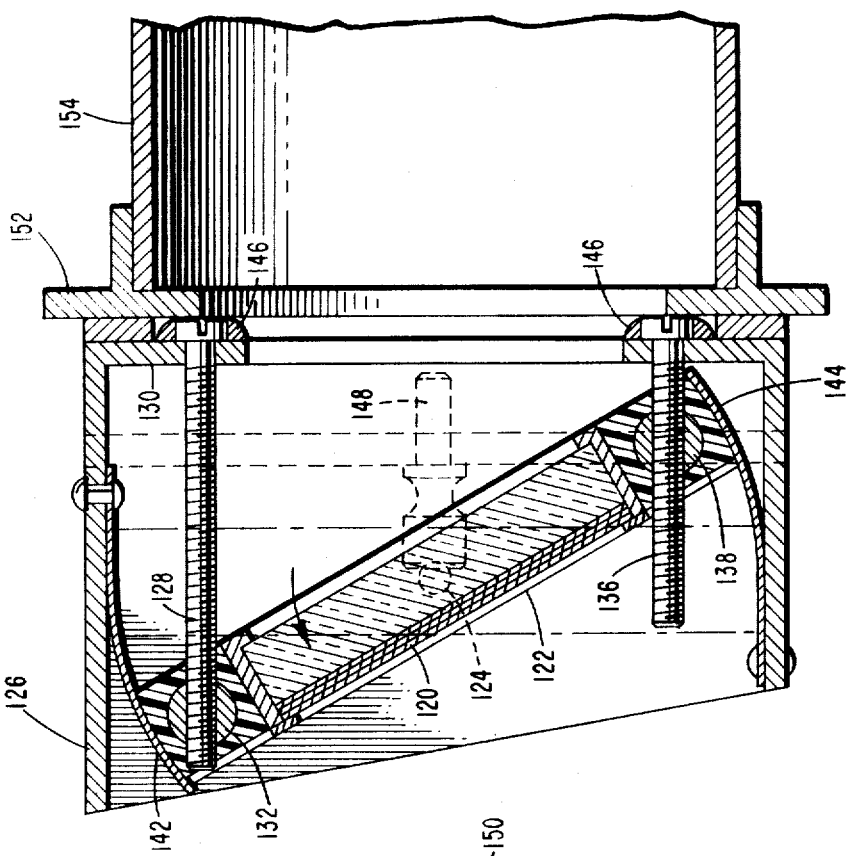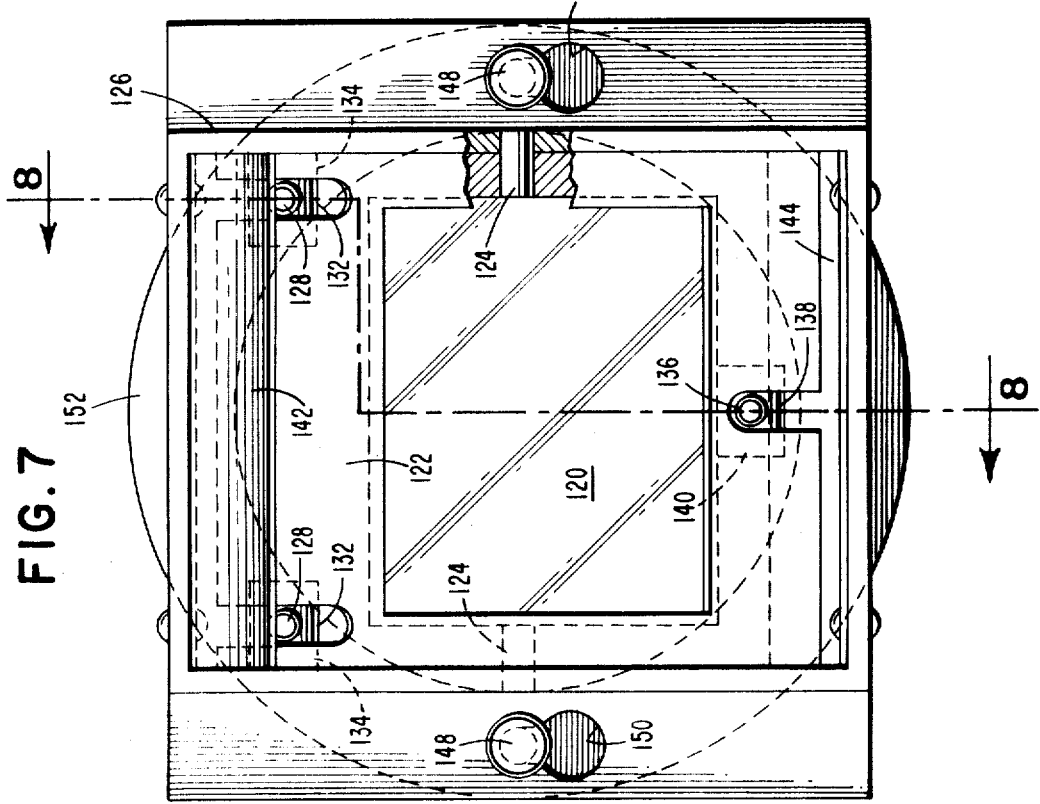

3,864,037

IMAGING SPECTROSCOPIC METHOD AND APPARATUS

BACKGROUND OF THE INVENTION

This invention relates to imaging spectroscopic methods and apparatus, and more particularly, it concerns a method and apparatus for visually examining an object or scene in any number of spectral regions by observing an image created by energy reflected or transmitted from the object or scene passing through a narrow band pass filter and an electronic image intensifier having adequate light amplification capability to compensate fully for the attenuation of energy produced by the narrow band pass filter.

It is well known that most if not all substances are individually unique in their ability to absorb, reflect or transmit specific wavelengths of light ranging from ultraviolet to near infrared. Accordingly, many diverse types of instruments and techniques have been available for spectral observation, analysis and/or identification of various substances. Perhaps the most common or well known type of instrumentation used for spectral analysis or identification of substances involves a technique referred to as line or one-dimensional spectroscopy in which light emanating from an object under observation is collimated and dispersed by a prism or diffraction grating to provide a line image for each wavelength of energy transmitted from the object or source. Whether the line images are viewed directly or recorded by photography, there is no direct correlation of the observed line images and the physical configuration of the object from which the light is transmitted.

More recently, the field of image or two-dimensional spectroscopy has evolved and has been found useful in providing meaningful information about the substance of objects of which a two-dimensional image can be formed. An example of image spectroscopy as presently practiced is multi-spectral photography wherein optical filters and either several cameras or several lenses in a single camera are employed to record a scene at different spectral band widths in the ultraviolet, visible and near infrared spectral regions. The resulting multiple photographs are then examined by trained interpretors who can, by noting the differences in contrast between objects and backgrounds at different spectral regions, derive important information about objects in the scene photographed; for example, the presence or absence of oil slicks on sea water, diseased trees in forested areas, areas of inflammation in living tissue, crystal phase differences on metallurgical specimens and the like. Much of the value of such multi-spectral photography derives from a capacity to emphasize contrast differences which are not otherwise apparent to normal photographic film recording over relatively broad spectral band widths nor to the human eye observing an object in transmitted light composed of all or most visible wavelengths.

In the practice of image spectroscopy, spectral enhancement of the object observed increases as the range of light wavelengths passing the optical filter is reduced. Hence maximum or optimum spectral enhancement results where the band pass width of the filter is minimized. Narrowing the band pass of the filter, however, increases light attenuation by the filter to a point where the amount of light transmitted from the object and through the filter is reduced to such a level as to be non-detectable by the human eye. This problem has to some limited extent been overcome by using a highly sensitive photographic film so that the attenuated light passing the filter can be accumulated to produce a record of the image either by exposing the film for relatively long periods of time (e.g., several hours or more), or by broadening the band pass width of the filter. Because of the light attenuation caused by the filter, therefore, image spectroscopy as practiced heretofore has involved either a compromise in the filter band pass width or has entailed a very delicate, time consuming and tedious process tolerable only under sophisticated laboratory conditions. In other words, either spectral enhancement has been sacrificed as a result of broadening the band pass of the optical filter in order to reduce the time required for film exposure, or long exposure times are required with obvious limitations on utility.

An alternative approach to overcoming the light attenuation by the filter is to illuminate the scene or object under observation with a high intensity source of illumination and thus increase the amount of light available to pass the filter. Here again, however, limitations are imposed on the circumstances in which this technique can be used, specifically, the scene or object under observation must be capable of being illuminated sufficiently to overcome filter attenuation. While this is possible in a laboratory or the like, it is not practical in many situations and perhaps not possible where the scene or object is located remotely from the place of observation. Also this latter technique imposes limitations on the range of energy wavelengths in which the object or scene can be observed due to the absence of some wavelengths in the source of illumination.

SUMMARY OF THE INVENTION

In accordance with the present invention, the limitations of prior methods and apparatus for observing and/or recording a two-dimensional image in light of a particular spectral band reflected from or transmitted through a scene or object, as well as the problems attendant to such limitations, are effectively and substantially overcome by passing the light energy emanating from the object or scene through a light attenuating filter adapted to transmit only wavelengths of energy within a restricted spectral band to form a low intensity light image and restoring the intensity of the light image passing the band to a value at which it is capable of spontaneous and direct visible observation. It is contemplated that the image so formed can be viewed directly, photographed, magnified or otherwise processed in accordance with known optical techniques. Also in accordance with the present invention, the particular narrow spectral band of light energy forming the image of the scene or object may be defined in amy desired center wavelength in a wide range of wavelengths. In this context, the term "light energy" as used herein and in the appended claims is intended to include not only the entire visible portion of the spectrum but also those wavelengths of electromagnetic energy which lie adjacent to the visible spectrum; that is, ultraviolet to approximately 3000 Angstrom units and infrared to approximately 10,000 Angstrom units (A).

The apparatus employed to practice the invention involves essentially an image forming objective lens by which the light image transmitted or reflected from the object or scene is passed through a narrow band pass optical filter, preferably though not necessarily of the optical interference type, and then through an electronic image intensifier tube of a type similar to that employed in night vision equipment so that attenuation of the light image after passing the objective lens and the optical filter is restored to a value comparable to the intensity of light originally reflected or transmitted from the object or scene, irrespective of the particular wavelength band passing the filter. Various specific embodiments of filters and/or filter mounts can be employed depending on the intended use of the apparatus. In one embodiment, for example, the filter may be an elongated, preferably annular wedge filter capable of transmitting center wavelengths varying from ultraviolet through the entire range of visible wavelengths to near infrared, the specific desired center wavelengths being selected by rotatably adjusting the position of the filter so that the region on the filter corresponding to the selected band pass is aligned with the aperture of the objective lens. In another embodiment, the wavelength band of energy passed by the filter is adjusted through a relatively smaller range by adjusting the angle of inclination between the objective lens optical axis and the plane of an optical filter rated at a particular or nominal center wavelength band pass when positioned perpendicular to the transmitted path of light. In this way, the full range of the annular filter of the first mentioned embodiment can be achieved, though in increments afforded by the relatively small range of each of a family or group of optical filters. In still another embodiment, where further refinement of specific spectral wavelengths is required, a narrow band pass optical filter is precisely "tuned" by adjusting and then fixing the angle at which the filter is disposed to the axis of a mount which coincides with the axis of the objective lens of the imaging spectroscopic instrument. Regardless of the particular form or embodiment of the apparatus employed, each provides an easily handled, versatile and effective imaging spectroscope.

The term "narrow band pass optical filter" as used herein and in the appended claims is intended to include present commerically available optical filters having a band width or half power band width less than five percent of its nominal center wavelength. For example, such a narrow band pass optical filter having a nominal center wavelength of 5,000 A would pass only wavelengths of light falling between 4,875 A and A would 5,125 A or a maximum band pass width of 250 A. More refined filters have a reduced band pass width.

Among the objects of the present invention are therefore: the provision of an unique method and apparatus by which a two-dimensional, spectrally enhanced image of an object or scene can be visually observed directly and spontaneously irrespective of the particular wavelengths of light energy in which the image is formed; the provision of such a method and apparatus which can be adapted to a wide range of applications where it is desired to observe an image of a naturally illuminated scene or object by light energy transmitted or reflected from the scene or object and within a restricted spectral band; the provision of an imaging spectroscope adaptable to the observation of a naturally illuminated object or scene in any one of several bands of light energy wavelengths within the range of ultraviolet, visible and infrared light wavelengths; the provision of an unique method and apparatus by which a scene or object illuminated by natural light can be observed in a narrow band of light energy wavelengths in which the central band wavelength is precisely established and the provision of a spectroscopic method and apparatus in which the major operating components are available from existing commercial sources.

Other objects and further scope of applicability of the present invention will become apparent from the detailed description to follow taken in conjunction with the accompanying drawings in which like parts are designated by the same reference numerals.

BRIEF DESCRIPTION OF THE DRAWINGS

FIG. 3A is a side elevation of an alternative embodiment of an imaging spectroscope in accordance with the present invention;

FIG. 3B is a schematic view depicting the angular relation of a filter with respect to an axis of incident light energy;

FIG. 4 is an enlarged front elevation as seen on line 4—4 of FIG. 3A;

FIG. 5 is an enlarged fragmentary cross-section taken on line 5—5 of FIG. 4;

FIG. 6 is an enlarged fragmentary plan view in partial section of a further alternative embodiment of the imaging spectroscope of the invention;

FIG. 7 is a front elevation at an enlarged scale and as seen at line 7—7 of FIG. 6;

FIG. 8 is a fragmentary cross-section on line 8—8 of FIG. 7; and

FIG. 9 is a schematic view illustrating an apparatus by which the narrow band pass filter used in the apparatus of the present invention may be accurately tuned.

DETAILED DESCRIPTION OF THE PREFERRED EMBODIMENTS

Figure 1:
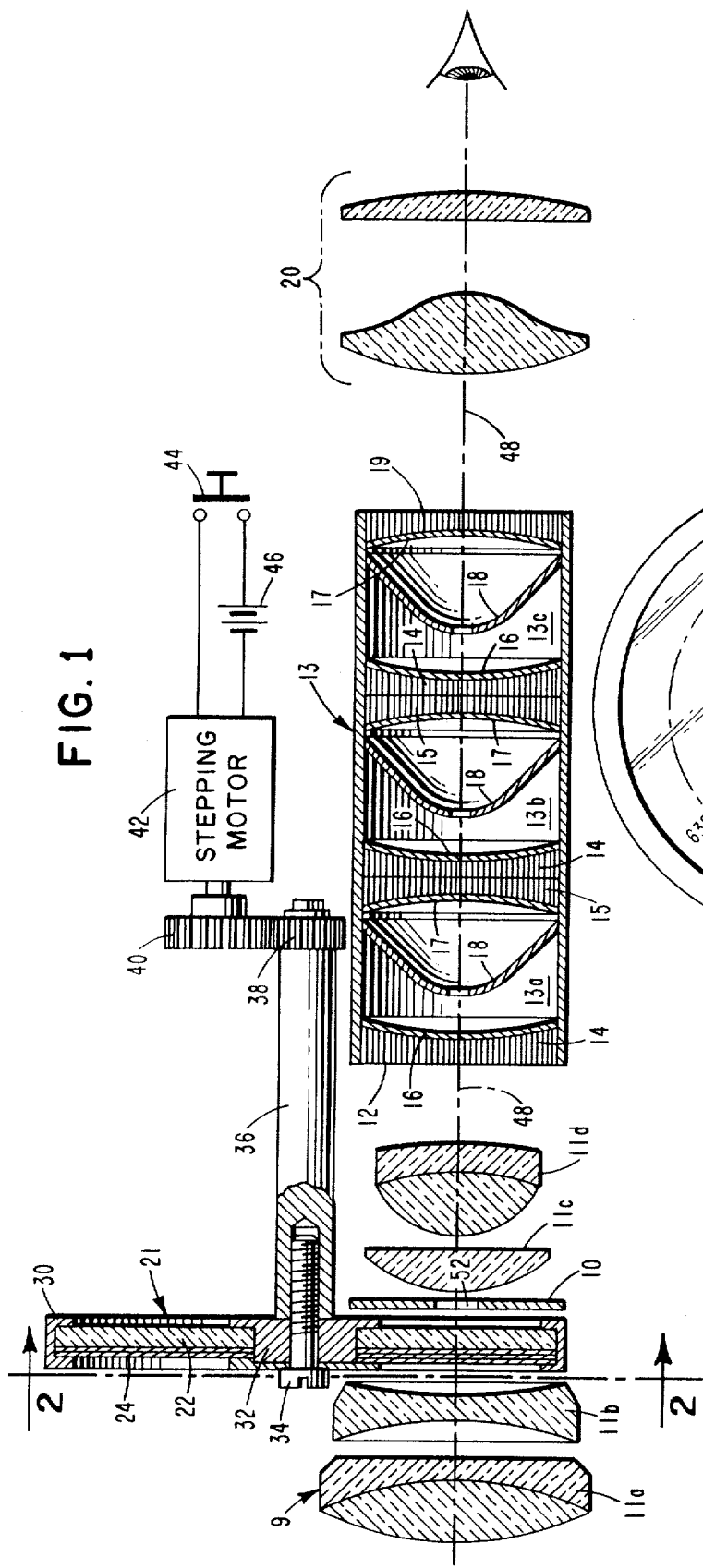
FIG. 1 is a schematic view illustrating an exploded longitudinal cross-section through one embodiment of the invention and illustrating the major optical components thereof.
Figure 2:
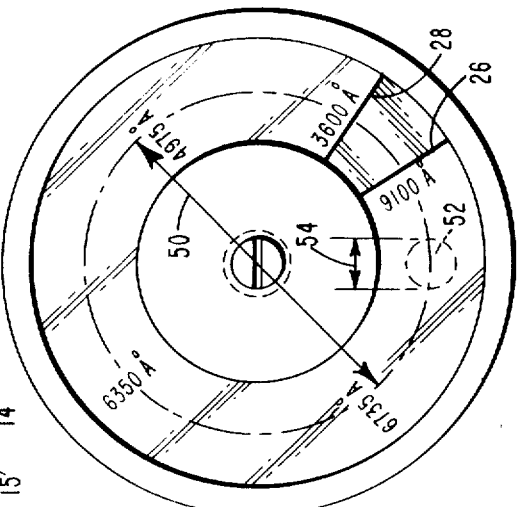
FIG. 2 is an elevation of the optical filter employed with the embodiment of FIG. 1 as seen on line 2—2 of FIG. 1.

In FIGS. 1 and 2 of the drawings, one embodiment of an imaging spectroscope in accordance with the present invention is shown to include a high-performance objective lens 9 having a adjustable diaphragm 10 and four lens elements 11a, 11b, 11c and 11d. The lens is operative to provide an image of an object or scene being observed on a fiber optic end face 12 of an image intensifier tube generally designated by the reference numeral 13. The image intensifier 13 is not novel in itself, but is a commercially available, electrostatically focused, multi-stage photocathode, one acceptable form of which is manufactured and sold by Radio Corporation of America under the trade designation Type 4550. Such image intensifiers are commonly used in night vision devices because of their capacity to increase the intensity of an image formed on the end face 12 up to at least 40,000 times. Although a detailed description of the intensifier in itself, therefore, is not necessary to a complete understanding of the present invention, it is noted that the intensifier 13 of the type shown in FIG. 1 generally includes three stages 13a, 13b, and 13c, each having axially spaced fiber optic input and output bundles 14 and 15, respectively. The back face of each of the input bundles 14 is ground to provide a spherical concave surface on which a multi-alkali photocathode layer 16, one acceptable form of which is manufactured and sold by ITT under the trade designation S-25, is coated. Similarly, the front face of the output fiber optic bundle 15 in each stage is ground to provide a spherically concave surface on which a photophosphor layer 17 is deposited. Electrostatic focusing for each stage is provided by an electrostatic accelerator 18 in each stage, respectively. It is noted that although the intensifier is intended by design to intensify rather than convert an image formed in energy wavelengths falling primarily within the visible range or approximately 4,000 to 7,000 A, the wavelength range to which the photocathode layers 16 are sensitive extends well into the shorter wavelengths of energy characterized by ultraviolet light and into the near infrared range of energy wavelengths. Hence, an image formed on the face 12 by the lens 9 and presented on the opposite end face 19 or output of the image intensifier to be observed directly through an eye-piece 20 may be formed by light energy as defined above or a range of from 3000 A to 10,000 A.

Also it is pointed out that the assembly of the objective lens 9, including the adjustable diaphragm 10 and the four lens elements 11a–11d, the intensifier tube 13 and the eye-piece 20, constitutes the principal optical components of a night vision device manufactured and sold by Aspheronics, Inc,. of Leesburg, Virginia under the trade name SCOTOS I. When equipped with an appropriate high-speed objective lens, and because of the gain capacity of the intensifier 13, such devices are capable of restoring to normal day-light intensity the images of objects or scenes illuminated only by the amount of light available on a cloudy moonless night (i.e., 3.0 times $10^{-5}$ ft-candles).

In accordance with the present invention, specifically the embodiment illustrated in FIGS. 1 and 2 of the drawings, a rotatable annular interference wedge filter 21 is disposed in the objective lens 9 between the lens element 11b and the diaphragm stop 10. The interference filter in itself is formed by a transparent annular support 22 of glass, quartz or other optically suitable material having multiple coating layers 24 on its front face of varying thickness in accordance with well-known interference filter technology to provide continuously variable energy wavelength transmittance from one radially disposed end 26 to the other such radial end 28 as shown in FIG. 2. By way of example, the coating layers 24 might be thickest at the radial end 26 and be operative in the sector near that end to filter out all wavelengths of light energy except those approximating 9100 A. The coating thickness will diminish uniformly around the annular filter and be thinnest at the radial end 28 where wavelengths on the order of 3600 A are permitted to pass with blockage of all other wavelengths. The thickness, and correspondingly the energy wavelengths passing the filter intermediate the two ends 26 and 28 will vary on a substantially linear basis around the annular filter.

As shown also in FIGS. 1 and 2, the interference filter established by the transparent support 22 and coatings 24 is provided about its outer periphery with a protective frame 30 and supported centrally by a hub 32 fixed by appropriate means such as screw 34 to the end of a rotatable axle 36 appropriately journalled in a support (not shown) and carrying a gear 38 on one end. The gear 38 in turn meshes with a gear 40 driven by a stepping motor 42 adapted to operate in conventional fashion by switch means 44 in a circuit including a power source 46. Also it will be noted that the axle 36 is offset from the objective axis 48 by a distance approximating half the median diameter 50 of the annular filter so that the median diameter is tangent to the objective axis 48. This relationship is illustrated in FIG. 2 in which the aperture of the lens diaphragm 10 is depicted by the reference numeral 52 having a diameter 54 selected in a manner to be described below.

It will be appreciated by those familiar in the art that maximum spectral contrast enhancement of the image observed at the eye-piece 20 will occur when the range of energy wavelengths from which the image passing the filter is formed is minimal. Hence, the selection and design of the lens 9 as well as the filter 21 are predicated on providing a minimal width band pass on the annular filter element which, because of the arrangement of the filter in relation to the lens elements 11 and the diaphragm 10, can be essentially equated to the diameter 54 of the diaphragm aperture 52. If it is assumed that the total wavelength range of the filter 21 is fixed at 5500 A and the intensifying gain of the tube 13 at 40,000X, selection of such parameters as lens focal length, aperture stop of the diaphragm 10 as well as the diameter and mediam circumference of the filter coatings 24 may be determined. At the outset, it is to be noted that the image intensity per unit area at the plane of the image, in this case the end surface 12 of the intensifier tube 13, is inversely proportional to the square of the f-stop setting of the diaphragm 10, Hence by virtue of the light attenuation through the lens 9 alone, the intensity of the image on the end face 12 where the diaphragm is set at a stop value of f/16 is 1/256 or 0.0039 of the naturally illuminated scene under observation. Because the intensifying capacity of the tube 13 is assumed at a maximum of 40,000X, the net gain available to the filtered image is 0.0039 times 40,000 or 156.25X. Assuming further that the ratio of the band pass width in Angstrom units to the total range of the filter is directly proportional to filter attenuation, the minimum band pass width permitting full restoration of image intensity passing the filter is approximately the total wavelength range of the filter (5500 A) divided by the net gain of the system after lens attenuation; that is, 5500/156.25 or 35.2 A. If it is assumed further that the focal length of the lens 9 is 75mm, the actual diameter 54 of the aperture 52 will be 75/16 or 4.69mm. Since this diameter is correlated directly to the length along the median circumference of the filter 24 employed for a given setting of the filter in relation to the axis 48 of the lens 9, the required length of the filter median circumference can be determined by dividing the total filter range (5500 A) by the minimum band pass for full image intensity restoration (35.2 A) and multiplying the quotient by the diameter of the diaphragm aperture (4.69mm) or, in the example given, 732.8mm. The median diameter 50 of the filter 21 in the embodiment illustrated in FIG. 1 would be therefore 233.1mm or 9.18 inches.

Although in the previous example an overall wedge filter range of 5500 A was used, it is also contemplated that the wavelength of the filter may be reduced for some applications of the imaging spectroscope shown in FIGS. 1 and 2. For example, assuming that the wavelength range of the wedge filter 21 is 2800 A or slightly more than one-half the total filter range given in the example above, and assuming further a median filter length of 735mm, the wavelength range per millimeter of median filter length will be 3.81 A resulting in a per millimter transmittance (3.81/2800) of 0.0014 percent or a per millimeter attenuation of 99.86 percent. If the lens 9 is designed with a focal length of 35mm, at an aperture stop of f/8, the diameter of the aperture becomes 4.375mm. Hence the band width transmittance is 16.7 A (.60 percent transmittance). The gain needed to restore the image formed on the intensifier tube face 12 to full value is 166.67X, substantially less than that available in the system using an f/8 lens aperture. Specifically, the gain available after lens attenuation in this instance is 40,000/64 or 625X. Thus with a relatively narrow band pass (16.7 A), an image can be viewed readily even though the amount of light by which it is illuminated is less than normal day-light conditions.

Thus it will be appreciated that the design parameters of the lens and filter used in the spectroscope depicted in FIGS. 1 and 2 of the drawings may be varied to suit specific needs or requirements. In use, the observation of objects or scenes at different spectral wavelengths is effected by actuating the switch means 44 causing the stepping motor 42 to rotate the filter through angular increments correlated to a variety of center wavelengths throughout the range of the filter. By comparing the contrast enhancement of the several images thus observed, much information concerning the substance of the material from which the image is formed can be determined. Also, the eye-piece 20 can be replaced by a relay lens and mount by which conventional cameras, or television cameras or the like can be utilized in the observation and/or recording of the image produced. Further, the objective lens 9 can be replaced by microscopic or telescopic objective lenses of more or less conventional design to extend the utilization of the imaging spectroscope into microscope, macroscopic and astronomic applications.

In FIGS. 3-5 of the drawings, an alternative embodiment of the present invention is shown to include a vernier filter mount and image intensifying apparatus designated generally by the reference numerals 60 and 62, respectively. The image intensifying unit 62, though shown in orthographic projection in FIG. 3A, embodies the same organization of the objective lens 9, intensifier tube 13 and eye-piece 20 described above with respect to FIGS. 1 and 2 and in itself, constitutes a night vision device sold by Aspheronics, Inc. under the trade name SCOTOS I as indicated above. Though the optical components of the objective lens and the eye-piece lens are not fully illustrated in FIGS. 3 to 5, the manner in which those components are incorporated in the unit 62 as shown in FIGS. 3A, for example, is believed apparent to those skilled in the art. Also in this respect, the objective lens 9 includes a conventional external lens housing barrel 63 and an aperture stop setting ring 64 whereas the eye-piece includes a focusing ring 66 in accordance with well-known optical principles. The device further includes a handle grip 68 and actuating switch trigger 70 to facilitate manual manipulation though it is contemplated that other specific manipulating and/or handling means may be used without in any way departing from the essence of the present invention.

The filter mount 60, as shown in FIGS. 3-5, includes a cantilevered bracket or supporting platform 72 suitably secured such as by upstanding integral arms 74 to a flange 76 formed as a component of a clamping ring 78. As shown in FIG. 3, the clamping ring 78 functions to fix the platform 72 firmly at the front end of the housing of the intensifier 13. A tripod mounting fixture 80 is arranged to depend from the bottom of the platform 72 near the rearward end thereof. A vernier and filter support frame 82 formed with a pair of undercut leg portions 84 at its lower end is adapted to be mounted on the platform 72 and fixed securely and adjustably along the length thereof by a pair of clamping set screws 86 as shown.

Mounted within the support frame 82 is a tilting filter retainer 88 pivotally supported for adjustable angular movement about a radial axis intercepting the longitudinal or objective lens axis by trunnion pins 90 and 92 journalled in the sides of the supporting frame 82. The trunnion pin 90 extends through the side of the supporting frame 82 and carries at its outwardly projecting end appropriate gearing (not shown) by which the pin 90 and filter retainer 88 is mechanically coupled to an adjustment knob 94 having a vernier scale 96 to facilitate angular adjustments of the filter retainer in one minute increments.

As shown most clearly in FIGS. 4 and 5 of the drawings, the filter retainer 88 is in the nature of a frame having a pair of forwardly projecting vertical wall portions 98 extending between and interconnected by relatively thin upper and lower frame portions 100 and 102, respectively. Locating dowels 104 project forwardly from the frame portions 100 and 102 to be received in complementary recesses formed in the top and bottom of a filter frame 106 machined along its sides to fit snugly between the inner surfaces of the projecting walls 98 on the tilting filter retainer 88. The filter frame 106 permanently supports an interference filter 108 and is removably secured in the tilting filter retainer 88 by a pair of pivotal clamping brackets 110 secured by studs 112 extending within each of the tilting frame wall portions 98. The brackets 110 carry set screws 114 adapted to bear against the sides of the filter frame 106 (see FIGS. 4 and 5) to secure the filter firmly and within the tilting filter retainer 88 without leakage of light around the filter 108.

To provide further against leakage of stray light about the filter 108, a collapsible bellows 116 is secured about the rear surface of the tilting filter retainer 88 and extends rearwardly to a clamping ring 118 for securement in light-proof fashion about the housing barrel 63 of the lens 9. In view of assembly thus described, it will be appreciated that the filter 108 can be adjusted in precise angular increments about the axis of the trunnion pins 90 and 92 in one minute increments. Also it will be seen that a group of filters each equipped with a filter frame 106 can be mounted interchangably in the vernier filter mount 60. Because of the bellows 116, the range of angular movement afforded the tilting frame 88 and the filter 108 is limited. As will be apparent from the following discussion, however, it is necessary only that the frame and filter be adjustable through approximately 30° from an upright or perpendicular position with respect to the axis of the lens 9.

Figure 3C:
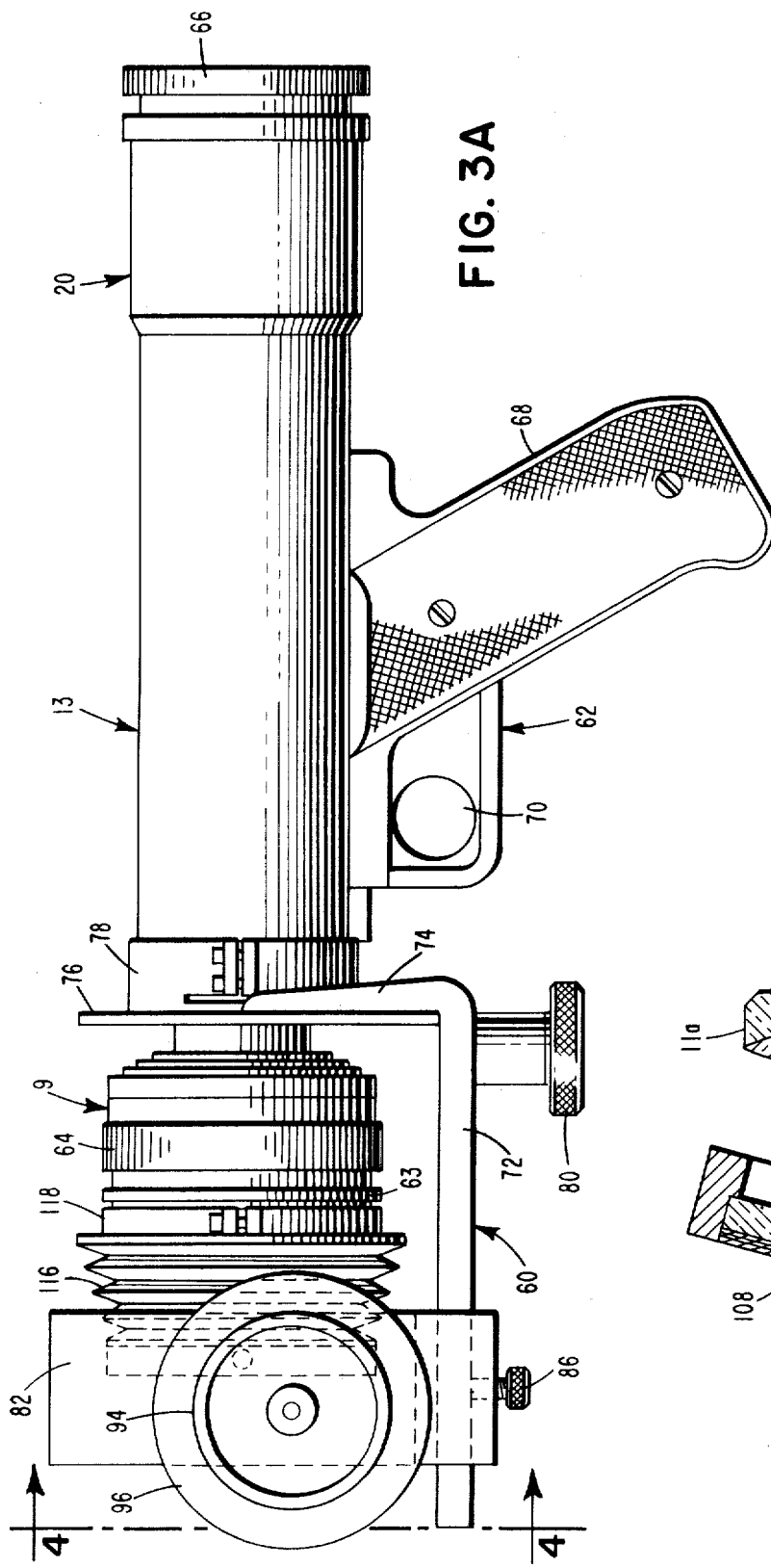
FIG. 3C is a mathematical formula for computing the center band pass wavelength for the filter shown in FIG. 3A.

The manner in which the embodiment illustrated in FIGS. 3-5 may be used to observe naturally illuminated objects or scenes by reflected or transmitted light energy falling within a narrow band of wavelengths will now be explained with reference particularly to FIGS. 3B and 3C of the drawings. The filter 108 employed in the embodiment of FIGS. 3–5 preferably is one of a group of approximately twenty interference filters each having a minimum filter band width on the order of 5 A made with a nominal center wavelength varying in increments of slightly less than 200 A in the ultraviolet range wavelengths to in excess of 400 A in the infrared. Such filters are manufactured so that the rated center wavelength applies only when the filter is disposed at 90° to the axis of viewing or in this instance, the axis 48 of the objective lens 9. The center wavelength of the spectral band passing each such filter will vary with angular displacement of the filter from its perpendicular orientation with respect to the optical axis in accordance with the formula shown in FIG. 3C where $\lambda$ is the center wavelength for a filter tilted at an angle $\phi$ with respect to the optical axis 48, $\lambda_c$ is the nominal center wavelength of that filter when perpendicular to the optical axis and $n$ is the effective index of refraction of the filter. Thus, by adjusting the angle $\phi$ using the vernier knob 94 in the embodiment of FIGS. 3 to 5 and where, for example, the nominal center wavelength of the filter 108 is 5310 A, the range of center wavelengths accommodated by that filter where the angle $\phi$ is varied from zero to 28° is 286 A. Hence a single interference filter 108 having the nominal center wavelength of 5310 A can be reduced in increments to an effective center wavelength of 5024 A. Similarly, a filter having a nominal center wavelength of 5600 A, can be reduced to 5298 A where the angle $\phi$ is changed from zero to 28°, thereby providing an overlap in the actual adjusted transmittance band center wavelength of the two filters mentioned. Hence, by using a group of filters (on the order of twenty in number) the entire spectrum including some ultraviolet and extending through the visible into the near infrared can be accounted for using the apparatus illustrated in FIGS. 3 to 5; thereby providing a capability in terms of the range of concise spectral band widths comparable to the embodiment of FIG. 1.

The embodiment of FIGS. 3 to 5 offers less facility for adjustment through the full range of spectral band wavelength than the embodiment of FIG. 1 because of the requirement in this latter instance for interchanging several filters. There are, however, a number of important advantages in the embodiment of FIGS. 3 to 5 which more than compensate for the diminished facility for adjustability particularly where the intended use for the spectroscope requires a reduced band width of specific wavelengths passing the filter without having a direct effect on the image intensification gain capacity of the instrument. For example, the minimum band pass width for commercially available interference filters at the present time is approximately five Angstrom units (5 A) for energy incident at 90° to the filter surface. Because all real objective lenses transfer energy over a finite cone of incident angles, the effective band width of the filter 108 in the embodiments of FIGS. 3–5 can be assumed to be on the order of 20 A. This band pass width, however, is not dependent in any way on the aperture stop setting of the objective lens as in the case of the embodiment of FIGS. 1 and 2 described above, inasmuch as the same band pass width applies over the total area of the filter 108. As a result, attenuation of light energy by the lens 9 in this latter embodiment can be reduced to a minimal value. For example, the mathematical energy attenuation of the lens 9 at a diaphragm stop setting of f/1 can be assumed as one, leaving the full gain capacity of the intensifier 13 for restoration of the image intensity attenuated only by the filter. Inasmuch as the intensification gain of this order is not required except where the object or scene under observation is illuminated by significantly less than normal light, adjustment of the objective lens diaphragm 10 by way of the ring 64 may be used primarily as means to vary the intensity of the restored image through the eye-piece 20. In addition this permits longer objective lens focal lengths to be used without expanding band width of the spectroscope system.

In FIGS. 6–8 of the drawings, a further alternative embodiment of the invention is shown which is intended for use where precision of the center wavelength of the energy band passing the filter is more important than facility for adjusting the central wavelength. Such conditions exist where the spectroscope is used to identify specific substances as distinguished from spectroscopic surveys or analyses to determine what substances are present. Thus in this embodiment, a narrow band pass interference filter 120 is fixedly mounted in a frame 122 in turn supported for pivotal adjustment by pins 124 in a generally rectangular light shield support 126. A pair of upper set screws 128 extend from a rear flange 130 of the light shield support and engage threadably in a pair of trunnion nuts 132 pivotally secured in recesses 134 in the upper portion of the filter frame 122. Similarly, a single lower set screw 136 extends from the rear flange portion of the light shield support 126 to threadably engage a single trunnion nut 138 secured within a central recess 140 in the lower central part of the filter frame 122. Upper and lower light shielding baffles 142 and 144, respectively, extend across the front opening of the shield support and project inwardly from the upper and lower walls thereof to effect a light shield about the filter frame 122 at the upper and lower surfaces thereof except for the recesses 134 and 140 in which the trunnion nuts are disposed. Once the angular orientation of the filter 120 has been set in the manner described below, these recesses are filled with an opaque cement-like material to complete a seal about the filter and between the frame 122 and the upper and lower baffles 142 and 144, respectively. Also the adjustment of the set screws 128 and 136 is fixed by cement 146 after the angular orientation of the filter has been set.

As shown most clearly in FIGS. 6 and 7, the light shielding filter support 126 is supported by screws 148 engaging in bayonet slots 150 located in the rear flange of the light shielding support. The screws 148 extend into a forwardly facing mating flange 152 secured on the front end of an extension barrel 154 which in turn is threadably coupled at the front end of a clamping barrel 156 as shown in FIG. 6. Thus it will be appreciated that the filter 120 may be secured in a fixed angular position with respect to the optical axis of the objective lens 9 in the embodiment of FIGS. 6–8 of the drawings.

As above indicated, the embodiment of FIGS. 6–8 is intended for use primarily in applications where a precise center wavelength of the light energy passing the filter is required. Although the current state-of-the-art with respect to the manufacture of interference filters is highly sophisticated, two to four percent tolerances are common. In narrow band pass interference filters where the nominal center wavelength approaches the range of near infrared, such tolerances can involve a discrepancy of 50 A or more. Hence, the embodiment of FIGS. 6–8 of the drawings overcomes the manufacturing tolerances in the filters by "tuning" each filter to a desired precise center wavelength using the apparatus illustrated schematically in FIG. 9 of the drawings.

As shown, the apparatus for determining the precise center wavelength and by which the center wavelength of the filter 122 when mounted in the manner illustrated in FIGS. 6–8 can be tuned to a desired value, includes a source of light 160 ideally having a black-body color temperature at or near 6000°K., though any incandescent color source having a color temperature in excess of 3000°K. will serve. The light from the source 160 is directed through a narrow entrance slit 162 of a monochromator of the grating type as shown. The monochromator, by means of a collimating mirror 164 and an optical diffraction grating 166 disperses light from the source into its spectral components; specifically, those which comprise the spectrum from about 3000 A to about 10,000 A in wavelength. In the monochromator shown, the desired narrow portion of the spectrum approximately 0.6 A in bandwidth is selected by manually rotating either a focusing a mirror 168 or the grating 166 or by a combination of both and is directed by the focusing mirror 168 through a narrow exit slit 170 to a collimating lens 172 mounted on an optical bench or other support to be coaxial with the diverging beam of essentially monochromatic light energy emerging from the exit slit 170. This collimating lens focuses the diverging rays into an essentially parallel beam which is directed at the interference filter 122 mounted on the same support as the lens 172. Although an angle indicating means 174 is illustrated in the drawing, it will be appreciated that the set screws 128 and 136 described above with respect to FIGS. 7 and 8 can affect an angular adjustment of the filter while mounted in the light shielding support 126. The collimated beam of monochromatic energy passing through the filter 120 passes a focusing lens 176 which converges the light beam to fill the entrance pupil of a photoelectric sensor 180. The sensor produces an essentially linear response over the whole spectral range of the instrument or ideally, the product of the source 160 output and the response of the sensor 180 is constant at all wavelengths. The output of the sensor is converted to a voltage or current reading on a meter 182 or other suitable electrical measuring or recording device. When the angle of the filter 120 is adjusted to the precise center wavelength, the meter 182 will indicate a maximum reading. Thereafter the set screws 146 are cemented and the angle of the filter 120 thereby secured, so that it becomes tuned to the precise center wavelength desired irrespective of nominal center frequency errors which may occur as a result of manufacturing tolerances.

It is noted that the monochromator and sensor components of the apparatus illustrated in FIG. 9 are in themselves commercially available components. For example, an acceptable monochromator for resolving the light energy transmitted to the collimating lens 172 is of a type identified commercially as a 0.3 Meter McPherson Model 218 with a resolving power of 0.6 A over a blaze range from 3000 to 10,000 A. The light source 160 is available from Pichel Industries by the name "Mini-Nova 75 Watt MK-II (Xenon)" with an integral reflector having a color temperature very close to the ideal of 6000°K. The photoelectric sensor is available from Radio Corporation of America and identified as No. PF-1023 Integral Photomultiplier II with a photocathode matching the spectral sensitivity of the intensifier tube 13.

Although the apparatus illustrated in FIG. 9 is particularly suited to tuning the filter assembly 120 in the embodiments of FIGS. 6–8 of the drawings, it is also useful in calibrating the angular settings of the filter 108 in the embodiment of FIGS. 3–5. In this latter instance, the angular indicating means 174 is used to record the angular adjustment at which the filter passes a specific center wavelength. By recording the angular adjustment shown by the indicator 174 for each such center wavelength of band pass, that same center wavelength may be achieved by adjustment of the vernier knob 94.

Thus it will be appreciated that the present invention provides an unique and useful method and apparatus for image spectroscopy. Although the utility of the invention has been generally indicated above, more specific examples of fields in which the invention is contemplated to have application include geophysical and biological exploration, pollution control, qualitative analysis and control in various manufacturing processes, medical diagnostics, law enforcement, military intelligence and surveillance and the like. In each of these applications, the facility offered by the spectroscope embodiments of the present invention for direct and spontaneous viewing of objects or scenes within the precise spectral band in a manner such that substances in the object or scene having different absorption reflectance or transmissive characteristics of energy wavelengths within the band may not only be identified, but correlated physically in a complete two-dimensional image. Moreover, by substituting for the eye-piece used in direct viewing other auxiliary relay optics, recording by means of conventional or television cameras can be accomplished; and by substituting for the objective lens shown, objective and relay lenses from telescopic or microscopic optical systems, the fields of application are broadened even further. The versatility of the invention is not only exemplified further by the embodiments disclosed herein, but also the specific spectroscopic embodiments may be used jointly in some applications. For example, it may be desirable to use both the embodiments of FIGS. 1 and 2 and FIGS. 6–8 in situations such as an aerial survey in connection with geophysical or biological exploration. The facility for observing an area quickly in multiple spectral bands in the first embodiment could readily be followed with the use of the latter embodiment to confirm areas of interest within a specific band width because of the capability for precision of a specific spectral band in the latter embodiment. Similarly, the embodiment secondly described above (FIGS. 3–5) can be used either in conjunction with the first embodiment or the third embodiment.

It will be appreciated, therefore, that the present invention fulfils the above stated objectives. Also it is to be understood that the description given above is intended to provide a basis for one skilled in the art to practice the invention and who, upon doing so, will find obvious variations in particular structure without in any way departing from the true spirit and scope of the present invention. Accordingly, it is intended that the description given herein is illustrative only, not limiting, and that the true spirit and scope of the present invention will be determined by reference to the appended claims.

I claim:
1. An imaging spectroscope comprising:
    a light attenuating narrow band pass optical filter adapted to pass wavelengths of light energy within a restricted spectral band and to block substantially all wavelengths of light energy outside of said band;
    means to form an image of an object or scene under observation solely with light energy passing said filter; and
    means to intensify said image to a level adequate for spontaneous and direct visual observation, said intensifying means being sensitive at least to light energy throughout the entire wavelength range of visible light.

2. The apparatus recited in claim 1 wherein said filter is a continuously variable elongated interference wedge filter and including means to support said wedge filter for adjustment along the length thereof relative to said image forming means whereby the restricted spectral band of light energy wavelengths passing said filter may be adjusted through the wavelength range of said wedge filter.

3. The apparatus recited in claim 2 wherein said wedge filter is in the shape of an annulus, said supporting means including a rotatably adjustable shaft concentric with said annulus and driveably connected to said wedge filter.

4. The apparatus recited in claim 2 wherein the wavelength range of said wedge filter extends from approximately 3000 A units to 10,000 A units.

5. The apparatus recited in claim 2 wherein said image forming means includes an aperture diaphragm, said diaphragm being located in close axial proximity to said wedge filter so that the diameter of said diaphragm aperture approximates the size of a portion of said wedge filter operative to pass light energy, thereby to establish the spectral band width of light energy wavelengths passing said wedge filter.

6. The apparatus recited in claim 1 wherein said filter is one of a group of interchangable filters, each of said interchangable filters having a specific spectral band pass, the passing wavelength range of the group extending from approximately 3000 A units to 10,000 A units.

7. The apparatus recited in claim 6 including means to support each of said filters for tilting adjustment with respect to the axis of said image forming means whereby the center wavelength of the spectral band passing each such filter may be adjusted through a limited range of band pass wavelengths.

8. The apparatus recited in claim 7 wherein the limited range of each one of said interchangable filters overlaps with the limited range of another of each such interchangable filters whereby any desired band pass center wavelength in the range of the group of said interchangable filters may be selected by selection of a particular filter and adjustment thereof to a particular angle of tilt with respect to the axis of said image forming means.

9. The apparatus recited in claim 1 wherein said filter is a interference filter having a nominal center transmittance wavelength when oriented at 90° with respect to the axis of incident light transmitted from the object or scene and comprising further, means to support said filter at a precise angular orientation with respect to the axis of said image forming means whereby the restricted spectral band of light energy wavelengths passing said filter may be adjusted to a precise center wavelength.

10. The apparatus recited in claim 9 wherein said filter support means includes means to fix the angular relation of said filter in relation to the axis of said image forming means.

11. The apparatus recited in claim 1 wherein said image forming means comprises an objective lens having an external housing barrel concentric with the axis of said lens, support means for retaining said filter on the axis of said objective lens and light shield means operative between said filter and said lens barrel to exclude all but light energy passing said filter from passing said lens.

12. The apparatus recited in claim 11 wherein said filter is a interference filter having a nominal center transmittance wavelength when disposed at 90° to the axis of said objective lens, and wherein said support means comprises means to retain said filter tilted at an angle to said axis such that the filter is tuned to a predetermined center transmittance wavelength other than said nominal center wavelength.

13. The apparatus recited in claim 12 wherein said filter retainer means includes releasable holding means to secure said filter, whereby said filter may be interchanged with other such filters having different nominal transmittance wavelengths.

14. The apparatus recited in claim 12 wherein said support means carries an indicating adjustment means connected to said filter retaining means thereby to enable variable adjustment of the angle at which said filter is tilted with respect to the lens axis.

15. The apparatus recited in claim 14 wherein said light shield means comprises a flexible bellows extending between said filter retaining means and said lens barrel irrespective of the tilt angle to which said filter is adjusted.

16. The apparatus recited in claim 12 wherein said filter retaining means includes means for adjustably fixing said filter at an angle with respect to said lens axis wherein the center transmittant wavelength of said filter is precisely tuned.

17. An imaging spectroscope comprising:
    light attenuating narrow band pass optical filter means to pass only wavelengths of light energy within a restricted spectral band and to block substantially all other wavelengths of light energy, said restricted spectral band being one of many within a spectral range including at least all visible light energy wavelengths;
    means to form an attenuated two-dimensional image of an object or scene under observation from light energy transmitted therefrom and passing said filter means whereby the light energy forming said image is limited solely to wavelengths within said spectral band and the intensity of said image attenuated to a level substantially below the intensity level of light energy transmitted from the object or scene; and
    means to intensify said attenuated image to a level sufficient for spontaneous and direct visual observation, irrespective of where in said spectral range, the particular restricted spectral band of light energy passing said filter to form said image may lie.

18. The method of image spectroscopy comprising: filtering light energy transmitted from an object or scene under observation to pass only a restricted spectral band of light energy wavelengths;

forming an image of the object or scene with light energy within said restricted spectral band, the intensity of said image thereby being attenuated to a level substantially below the intensity level of light energy transmitted from the object or scene; and intensifying said image to a level sufficient for direct and spontaneous visual observation, irrespective of where said restricted spectral band lies within a spectral range including at least all visible light energy wavelengths.

19. The method recited in claim 18 wherein said filtering step is effected by passing light energy transmitted from the object or scene through a finite portion of a continuously variable interference wedge filter, thereby to establish said restricted spectral band and comprising further the step of filtering different spectral bands of light energy wavelengths transmitted from the object or scene to enable such observation of correspondingly different spectrally contrast enchanced images of the same object or scene.

20. The method recited in claim 19 wherein said image is formed by an objective lens having an adjustable diaphragm stop aperture and including further the step of varying the width of said restricted spectral band by variation in the size of said aperture.

21. The method recited in claim 18 wherein said filtering step is effected with a narrow band pass interference filter and comprising further the step of tilting said interference filter to adjust the center wavelength of said restricted spectral band.

22. The method recited in claim 21 comprising further the step of interchanging one or more of a group of interference filters each being capable of passing different restricted spectral bands of light energy wavelengths within said spectral range.

23. The method recited in claim 22 wherein the spectral band passing each of said group of filters extends to or within the spectral band of a successive filter within said group thereby to enable observation of said image in increments of said full spectral range.

24. The method recited in claim 23 comprising further the step of adjustably tilting each of said group of interference filters with respect to a position normal to incident light rays transmitted from said object or scene thereby to enable observation of said image formed by light energy wavelengths within differing restricted spectral bands for each of said group of filters.

25. The method recited in claim 18 comprising the step of tuning a narrow band pass interference filter to a precise center wavelength of said restricted spectral band.

26. The method recited in claim 25 wherein said tuning step is effected by mounting said interference filter for adjustable tilting movement in a support having an axis coincident with the axis of light energy to be transmitted from the object or scene under observation; passing a monochromatic beam of light through said filter to means sensitive to the intensity of light passing said filter; adjusting the tilt angle of said angle filter until the intensity of said monochromatic light passing said filter reaches a maximum value; and fixing the tilt angle of said filter in said mount to the position at which the intensity of said monochromatic light passing said filter is maximum.

* * * * *